United States Patent [19]

Fowler et al.

[11] Patent Number: 4,698,912
[45] Date of Patent: Oct. 13, 1987

[54] MAGNETIC COMPASS CALIBRATION

[75] Inventors: John T. Fowler, Marblehead, Mass.; Douglas C. Gilbert, Ledyard, Conn.

[73] Assignee: The Laitram Corporation, New Orleans, La.

[21] Appl. No.: 807,523

[22] Filed: Dec. 11, 1985

[51] Int. Cl.$^4$ .............................................. G01C 17/38
[52] U.S. Cl. ......................................... 33/356; 33/361
[58] Field of Search ..................... 33/356, 361; 73/1 E

[56] References Cited

U.S. PATENT DOCUMENTS

| | | | |
|---|---|---|---|
| 3,938,257 | 2/1976 | Erspamer | 33/361 |
| 3,991,361 | 11/1976 | Mattern et al. | 33/356 |
| 4,031,630 | 6/1977 | Fowler | 33/356 |
| 4,262,427 | 4/1981 | Lynch et al. | 33/361 |
| 4,413,424 | 11/1983 | Sasaki et al. | 33/356 |
| 4,414,753 | 11/1983 | Moulin et al. | 33/356 |
| 4,416,067 | 11/1983 | Scherer | 33/356 |
| 4,445,279 | 5/1984 | Tsushima et al. | 33/356 |
| 4,546,550 | 10/1985 | Marchent et al. | 33/356 |

FOREIGN PATENT DOCUMENTS

| | | | |
|---|---|---|---|
| 76411 | 5/1982 | Japan | 33/361 |
| 22911 | 2/1983 | Japan | 33/361 |
| 26213 | 2/1983 | Japan | 33/361 |
| 85910 | 5/1984 | Japan | 33/361 |

Primary Examiner—Richard R. Stearns
Attorney, Agent, or Firm—Weingarten, Schurgin, Gagnebin & Hayes

[57] ABSTRACT

A method and apparatus for providing a magnetic compass, and system to accurately calibrate the compass with a rotation of the vessel on which the compass is mounted through a single rotation of 360 degrees. The compass comprises gimballed field sensing elements, and processor to provide a signal which is corrected for compass offsets, for permanent magnetic field anomalies and for induced magnetic field anomalies.

6 Claims, 4 Drawing Figures

MAGNETIC COMPASS CALIBRATION

FIELD OF THE INVENTION

The present invention relates to compasses, and in particular to magnetic compasses having orthogonal field sensing elements and error correction systems attached thereto.

BACKGROUND OF THE INVENTION

Magnetic compasses utilize a magnetic device to sense and measure orientation within an ambient magnetic field. In the absence of local magnetic anomalies, the ambient magnetic field is the earth's magnetic field. A pendulous mass is commonly used to retain a vertical compass orientation to avoid contamination by the vertical component of the earth's magnetic field. A freely pivoting magnet will align itself with the ambient magnetic field. The compass bearing, $\phi$, is determined by measuring the angle between the compass case, which rotates in space, and the pivoting internal magnet, which maintains its alignment with the horizontal component of the earth's magnetic field.

If the compass code wheel is not aligned with the internal magnet, the compass output will be biased. Also, magnetic material (other than the single internal magnet) attached to the code wheel assembly will cause a bias in the compass output.

Magnetic material attached to the compass case will rotate around the internal magnet, causing sinusoidal errors in the compass output. The compass internal magnet aligns itself with the vector sum of the earth's field and the field of the magnetic material. The general expression for multiple pieces of magnetic material is:

$$\phi = \theta + a + b \sin \theta + c \cos \theta$$

where a is the bias error, discussed above, b and c are the sum of the amplitudes of the orthogonal components of the internal magnetic material, $\theta$ is the actual bearing of the compass case, and $\phi$ is the compass output heading.

The errors induced by permanently magnetized material are "one cycle" errors (i.e., functions of $\sin \theta$ and $\cos \theta$) because the permanently magnetized material amplitude does not change as a function of $\theta$.

Permeable magnetic material will assume and magnify any field with which it is aligned. Therefore, permeable magnetic material attached to the compass case will rotate around the internal magnet, causing a "two cycle" error (i.e., functions of $\sin (2\theta)$ and $\cos (2\theta)$) that can be expressed as:

$$\phi = \theta + d \sin (2\theta) + e \cos (2\theta)$$

where d and e are the sum of the maximum amplitudes of the orthogonal components of the internal permeable material. Note that the bias term, the "one cycle" errors, and the "two cycle" errors are all independent of any of the other errors, and therefore, error corrections or calibrations may be considered separately.

A well known method exists for calibrating and removing the compass deviation errors using five correction coefficients: A,B,C,D, and E, as discussed in the *Handbook of Magnetic Compass Adjustment*, Publication No. 226, Defense Mapping Agency Office, Stock No. NVPUB226, 1980. The A correction is simply the correction for compass bias or offset. The B and C corrections adjust for permanent magnetic anomalies within the compass, and the D and E corrections adjust for induced magnetic anomalies within the compass. The compass deviation correction for actual magnetic head is:

$$\text{deviation correction} = A + B \sin \phi + C \cos \phi + D \sin 2\phi + E \cos 2\phi$$

where $\phi$ is the compass reading. In order to calculate the deviation coefficients, it is necessary to place the compass on a rotary table with precise angular resolution and a known reference bearing. The compass must be rotated at a constant rate through 360° in each direction while the table bearings and compass bearings are recorded at regular increments and known positions of table bearing.

Another method of data collection is to stop the table at each measurement point and allow the compass gimbal swing to settle out prior to taking data at each point. This alternate procedure is much slower even though only one revolution is required.

When the data is taken on the fly, the method for determining the A, B, C, D, and E coefficients is derived by noting that the average of the differences between the actual compass heading $\theta$ and the compass reading $\phi$ is the sum of the average lag and the average deviation:

$$\overline{\theta - \phi} = \overline{L} + \overline{A + B \sin \phi + C \cos \phi + D \sin 2\phi + E \cos 2\phi}$$

The overbar indicates the average over all data points. Since the compass is rotated 360° in each direction at the same rate, $\overline{L} = 0$. Thus, $$\overline{\theta - \phi} = \overline{A + B \sin \phi + C \cos \phi + D \sin 2\phi + E \sin 2\phi}$$

Since A is constant for all values of $\theta$, $A = \overline{\theta - \phi}$.

To determine the B coefficient, each of the data points is multiplied by $\sin \theta$:

$$\overline{(\theta - \phi) \sin \phi} = \overline{A \sin \phi + B \sin 2\phi + C \sin \phi \cos \phi + D \sin \phi \sin 2\phi + E \sin \phi \cos 2\phi}$$

The only term on the right side of the equation that is not zero for 360° rotations is $$\overline{B \sin (2\phi)} = B/2$$

Therefore, $B = \overline{2(\theta - \phi) \sin \theta}$. The same method can be used for computing the C, D, and E coefficients by multiplying each of the data points by $\cos \phi$, $\sin 2\phi$, and $\cos 2\phi$, respectively. That is, $$B = \overline{2(\theta - \phi) \sin \phi}$$

$$C = \overline{2(\theta - \phi) \cos \phi}$$

$$D = \overline{2(\theta - \phi) \sin 2\phi}$$

$$E = \overline{2(\theta - \phi) \cos 2\phi}$$

It should be noted that the A error will change if the compass alignment is not preserved in its final mount. The B, C, D, and E errors will vary if the compass is mounted in a magnetic environment that is different from the one in which the compass was calibrated. Finally, the B and C errors vary with latitude.

The requirement of an absolute reference and a precise rotation renders field calibration impractical for most compass applications. Gyro compasses aboard ships have been used for years as a reference for "swing ship" calibrations of magnetic compasses, but gyro errors during maneuvering situations prevent precise calibrations in most cases. Therefore, a simple, accurate, and rapid field calibration apparatus and technique for magnetic compasses are necessary, but not heretofore available.

SUMMARY OF THE INVENTION

The solid state compass according to the present invention comprises two coils capable of measuring the intensity of the earth's magnetic field, mounted orthogonally and concentrically in the horizontal plane, so that the center of each coil coincides with rotation of the gimbal system. The system according to the present invention then calculates the average signal from the field sensing coils, which is the offset or bias. The field sensing coils are rotated through a fixed earth field to provide a sampled sinusoidal signal through a minimum of 360°, and sampled at approximately equally spaced intervals, using the uncorrected compass output as a reference. Thereafter, the phase error is estimated and corrected. As a result, the present invention provides five separate error signals that are then used to provide a correct magnetic angle without extensive testing or complex and expensive equipment. The amplitude of each coil is further compensated to provide a normalized peak-to-peak signal from which the corrected angle may be determined.

BRIEF DESCRIPTION OF THE DRAWING

These and other features according to the present invention will be better understood by reading the following detailed description, taken together with the drawing, wherein.

DETAILED DESCRIPTION OF THE INVENTION

Figure 1:
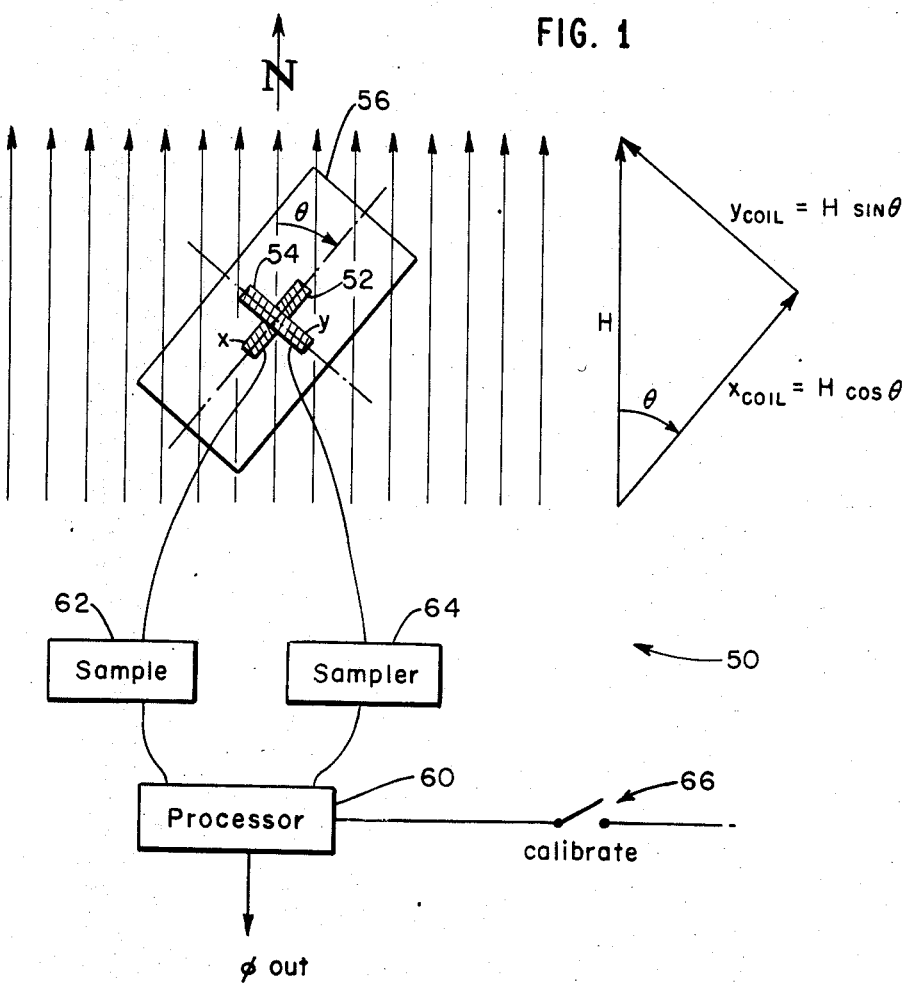
FIG. 1 is a schematic diagram showing the orientation of two field sensing coils.

The arrangement 50 of the two coils 52, 54 is shown in FIG. 1. The x coil 52 is parallel to the compass housing 56 so that when the compass is pointed north, the x coil 52 reads the magnitude of the horizontal magnetic field (H) and the y coil reads zero. Thus:

$y \text{ coil} = H \sin \theta$ $x \text{ coil} = H \cos \theta$

The compass heading $\theta$ is calculated by $\theta = \arctan[Y/X]$. The coil cruciform is symmetrical and fixed with respect to the compass case and contains no moving parts. It may be gimballed to provide a horizontal reference, or strapped down. The output signals from the coils 52 and 54 are sampled by respective signal samples 62 and 64 which provide a signal to the processor 60 for calculation of the bearing angle and to provide error correction. The errors are corrected during a calibration process, described below, when a calibration switch 66 enables the process. The samples 62 and 64 and the processor 60 may be analog, digital, or a combination thereof.

Any misalignment of the longitudinal axis of the x coil 52 and the lubber line 58 of the compass case 56 causes a bias error in the solid state compass that is identical to that of the optical compass, so that the compass output bearing is $\phi = a + \theta$ where a is the alignment error and $\theta$ is the actual compass bearing.

Any permanent magnetic material attached to the compass case may be modelled as a bias term in each of the coil outputs. Consider a permanent magnet with field strength Hp that is oriented so that the angle between the x coil axis and the axis of the permanent magnet is $\gamma$. The coil outputs are $X \text{ coil} = H \cos \theta + Hp \cos \gamma$ $Y \text{ coil} = H \sin \theta + Hp \sin \gamma$ Note that the values of Hp cos $\gamma$ and Hp sin $\gamma$ are constant because the permanent magnet is fixed with respect to the x and y coils and rotates with the compass case. If there were n permanent magnets within the case, then:

$X \text{ coil} = H \cos \theta + Hp_1 \cos \gamma_1 + Hp_2 \cos \gamma_2 + \ldots Hp_n \cos \gamma_n$ $Y \text{ coil} = H \sin \theta + Hp_1 \sin \gamma_1 + Hp_2 \sin \gamma_2 + \ldots Hp_n \sin \gamma_n$ Since Hpi sin $\gamma$i and Hpi cos $\gamma$i are a set of constants for i=1 to n, the coil outputs may be expressed in general as:

$X \text{ coil} = H \cos \theta + Px$ $Y \text{ coil} = H \sin \theta + Py$ where Px and Py are the summed effects of permanent magnetisum on the x coil and the y coil respectively. Therefore, any permanent magnetic material (not shown) with the compass or in the vehicle within which the compass is mounted creates a fixed DC level shift (bias) in each of the coil outputs. A small x coil bias ($|Px| << H$) will create a B-type deviation error with $B \simeq -Px/H$. Also, a small y coil bias ($|Py| << H$) will create a C-type deviation error with C Py/H. Therefore, for errors due to permanent magnetism of less than 15°, the solid state compass output is similar to that of the optical units. The errors may be corrected by removing the x and y coil bias prior to calculating the compass output azimuth $\phi$. The bias removal is the preferable means of calibration, since the bias correction is latitude independent.

Any soft iron or permeable material will have some field induced within it by the presence of the earth's field. The soft iron effect may be modelled by a bar of permeable material (not shown) oriented so that the angle from the x coil axis to the bar axis is $\gamma$. The magnitude of the field induced by the earth's field is a function of earth's field strength (H) and compass orientation ($\theta$):

$Hs = lH \cos (\theta + \gamma)$ where Hs is the induced field strength, l is the ratio of induced field strength to earth's field strength when the bar is aligned with the earth's field, $\theta$ is the actual compass bearing, and $\gamma$ is the angle measured from the longitudinal axis of the x coil to the longitudinal axis of the permeable material.

The induced field sums vectorially with the earth's field in the x and y coil outputs:

$$X \text{ coil} = H \cos \theta + Hs \cos \gamma = H \cos \theta + lH \cos \gamma \cos (\theta + \gamma)$$

$$Y \text{ coil} = H \sin \theta + Hs \sin \gamma = H \sin \theta + lH \sin \gamma \cos (\theta + \gamma)$$

Noting that $\cos (\theta + \gamma) = \cos \gamma \cos \theta - \sin \gamma \sin \theta$ and substituting it into the above expression yields:

$$X \text{ coil} = H(1 + lH \cos \gamma) \cos \theta - lH \sin \gamma \sin \theta$$

$$Y \text{ coil} = H(1 - lH \sin \gamma) \sin \theta + lH \cos \gamma \cos \theta$$

As in the case of the level bias model, it is trivial to show that for N pieces of soft iron, the values of $Hs \cos \gamma$ and $Hs \sin \gamma$ may be replaced by $$Hs_x = Hs_1 \cos \gamma_1 + Hs_2 \cos \gamma_2 + \ldots + Hs_n \cos \gamma_n$$

and $$Hs_y = Hs_1 \sin \gamma_1 + Hs_2 \sin \gamma_2 + \ldots Hs_n \sin \gamma_n$$

respectively. However, to demonstrate the physical process involved, the discussion will be continued using the single piece of soft iron as a model.

It is clear that the sinusoidal error term added to each coil causes an amplitude and phase shift in each of the coil outputs. The outputs may be written as $$X \text{ coil} = D_x H \cos (\theta + \gamma_x)$$

$$Y \text{ coil} = D_y H \sin (\theta + \gamma_y)$$

where:
$$\gamma_x = -\cotan^{-1}\{[1 + lH \cos \gamma]/l \sin \gamma\}$$

$$\gamma_y = \tan^{-1}\{[-l \cos \gamma]/[1 - lH \sin \gamma]\}$$

$$D_x = (1 + lH \cos \gamma) \cos (\gamma_x) - l \sin \gamma \sin (\gamma_x)$$

$$D_y = (1 - lH \sin \gamma) \sin (\gamma_y + 90) + l \cos \gamma \cos (\gamma_y + 90)$$

Since the precise value of the H-field is unimportant for compass applications, it may be assumed, without loss of generality, that $D_x = 1$ and that the x coil is the reference coil.

$$\sin (\phi - \theta) = [(D_y - 1) \sin (2\theta)] / \{SQR(2)SQR[(1 + D_y^2) + (1 - D_y^2) \cos 2\theta]\}$$

For $D < 10$, $$\phi - \theta \approx [(D_y - 1)(\sin 2\theta)] / \{SQR(2)[SQR(1 + D^2_y)]\}$$

$$\phi \approx \theta + [D_y - 1] / [SQR(2)SQR(1 + D_y^2)] \sin (2\theta)$$

If the phase shifts in the X and Y coils are equal in magnitude and opposite in sign ($\gamma = \gamma_y = -\gamma_x$), then $$\sin (\phi - \theta) = (\sin \gamma \cos 2\theta) / \{SQR[\cos^2 (\theta - \gamma) + \sin^2 (\theta + \gamma)]\}$$

For small values of $\gamma$:

$$\phi - \theta \approx \gamma \cos 2\theta$$

or $$\phi = \theta + \gamma \cos 2\theta$$

If the phase shifts in the x and y coils are not equal and opposite in sign, it is equivalent to phase shifting $\phi$ until the coil phase shifts are equal in magnitude and opposite in sign. In other words, the phase shift errors may be modelled as an A-type error and an E-type error.

The soft iron errors may be corrected by removing the gain mismatch and phase error between the coils. The removal of gain mismatch and phase error is the preferable means of calibration, since they are latitude independent corrections.

If the compass cruciform is not horizontal, then some of the horizontal field strength will be lost and some vertical component will be added. Specifically, $$X \text{ coil} = H[\cos \theta \cos P + \sin P \cos R] + z[\sin P \cos R]$$

$$Y \text{ coil} = H[\cos \theta \cos R + \sin R \cos P] + z[\cos P \sin R]$$

where P is the pitch angle, R is the roll angle, and z is the vertical field strength.

In order to calibrate a solid state compass, it is necessary to:
1. Remove the bias errors from each coil;
2. Remove the vertical field component from each coil;
3. Remove the gain mismatch between the two coils;
4. Remove the phase error between the two coils; and
5. Correct for misalignment between the x coil axis and the lubber's line of the compass.

In a controlled laboratory environment, the coil bias values may be measured by: (1) averaging data that is sampled at regular intervals around the compass, or by (2) identifying the minimum and maximum values for each coil and calculating the center value, or by (3) placing the compass in a mu-metal container and measuring the output in the absence of a magnetic field. For a field calibration, the second method is the simplest, i.e., to turn the compass through 360°, identify the minimum and the maximum points, and calculate the bias.

In a controlled laboratory environment, the coil gain mismatch may be measured by (1) averaging the squares of data that is sampled at regular intervals around the compass, or by (2) identifying the minimum and maximum values for each coil and forming a ratio, or by (3) inducing a known field in each coil, measuring its value, and forming a ratio. Again, for field calibration, use the second method.

The phase error between coils may be calculated from any ordered pair of x coil and y coil outputs, so that any data collected for steps 1 and 2 may be used in step 3. The preferred method is to select the phase error that minimizes the orthogonality errors between the pairs of coil outputs in the least-squares sense. The phase error may then be used to adjust the phase of the y coil output.

Any of the above calibration coefficients may be calculated using data collected during one or more compass revolution. The x coil absolute reference may be found by ensuring that the x coil reading is zero when placed at right angles to the lines of flux of the earth's magnetic field. The gimbals must be balanced so that the solid state coils do not pick up any components of the vertical field, or the vertical field may be measured by a third coil and the output signal may be used to remove the effect of vertical field bias in each coil output signal. If the gimbals are not properly balanced (with x,y coils horizontal) and the coil output signals are not corrected for the vertical field adjustment, the calibration procedure is still valid but only for the magnetic latitude where the calibration was conducted.

The calibration procedure may be alternately performed in part in the laboratory, wherein the following equations are computed:

$$X = X_{coil} - X_{bias}$$

$$Y = [(Y_{coil} - Y_{bias})(Y \text{ scale}) - (X)(S_{phase})]/C_{phase}$$

(for small error angles, $C_{phase} \simeq 1$)

$$\phi = \arctan(Y/X) \text{(corrected output)}$$

Using the corrected compass outputs after determining the above information, the next step is completed by measuring the difference between known headings and compass output headings. The result at any heading should be a fixed A, which is subtracted from the heading output as the final correction step.

$$\phi = \arctan(Y/X) - A$$

or $$\phi = A + \arctan(Y/X)$$

Repeat the first step in a field to calibrate out the magnetic effects of the final housing for the sensor.

For small angle errors, (less than 15 degrees), the relationship between the optical compass correction values and the solid state compass corrections are as follows:

$$A \simeq A$$
$$B \simeq \sin^{-1}(X \text{ bias}/H)$$
$$C \simeq -\sin^{-1}(Y \text{ bias}/H)$$
$$D \simeq \tan^{-1}(Y \text{ scale}) - 45°$$
$$E \simeq \sin^{-1}(S \text{ phase})/2$$

A calibration method has been developed to provide a simple procedure for field calibrating solid state compasses. The calibration technique requires only a slow rotation of the compass through at least 360° and a digital computer for parameter calculations.

Figure 2:
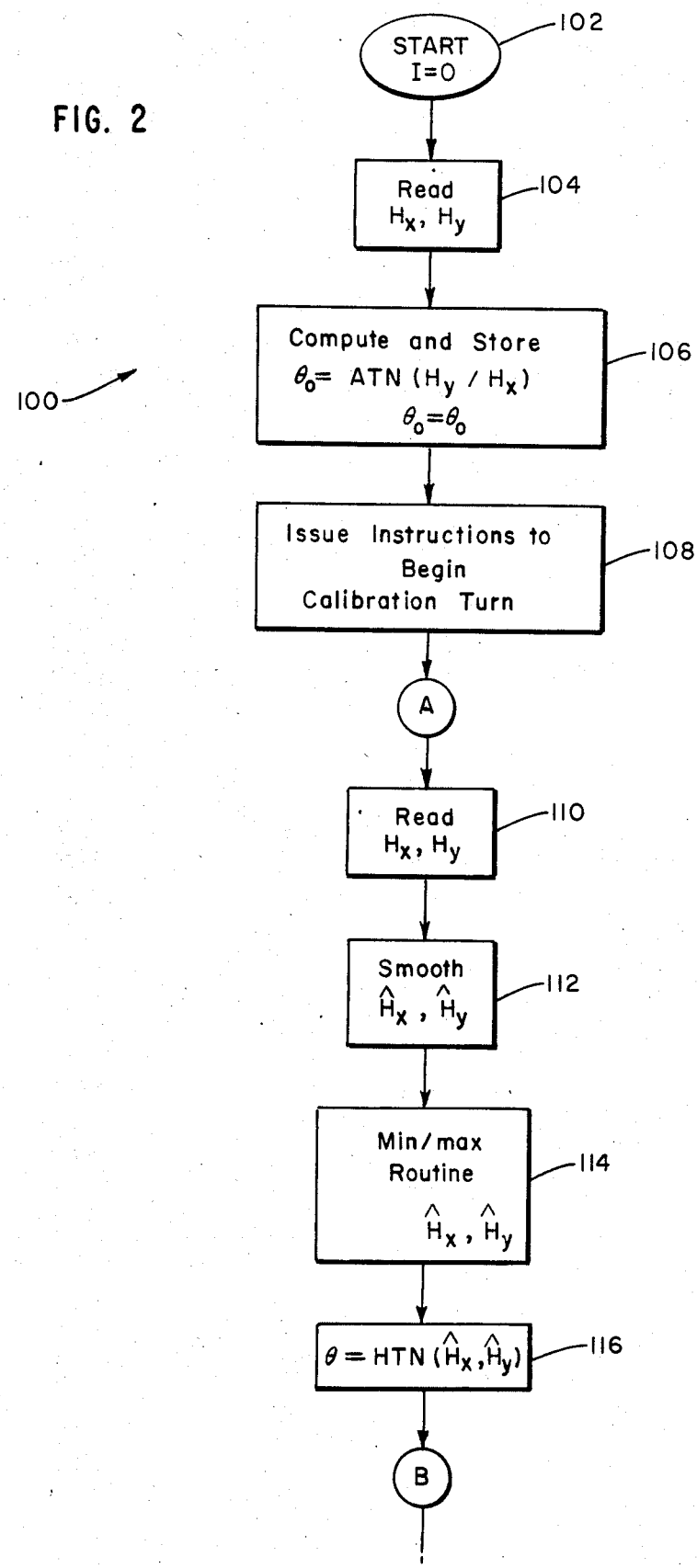
FIGS. 2–4 comprise a flow diagram sequence detailing the process according to the present invention.
Figure 3:
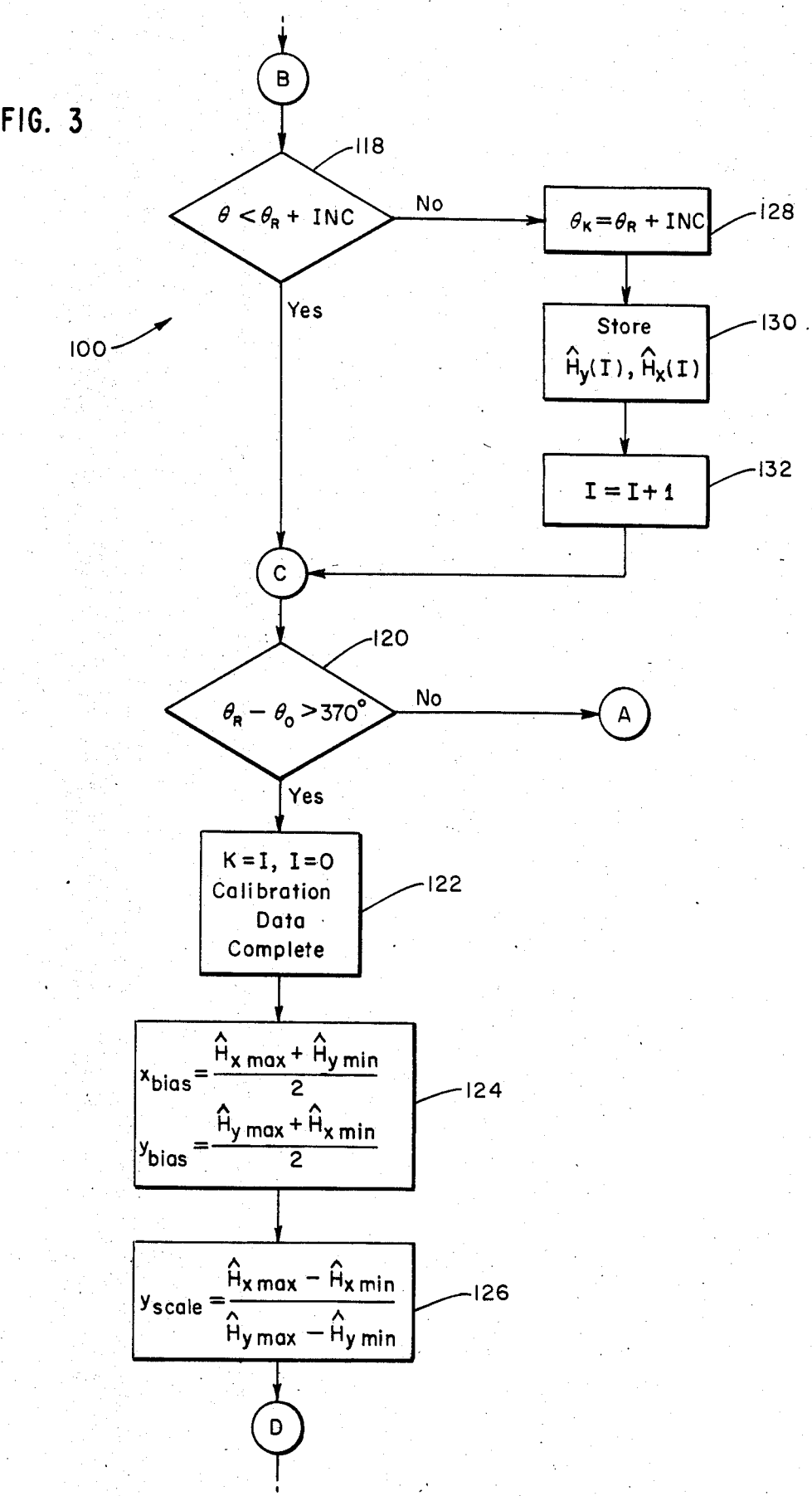
Figure 4:
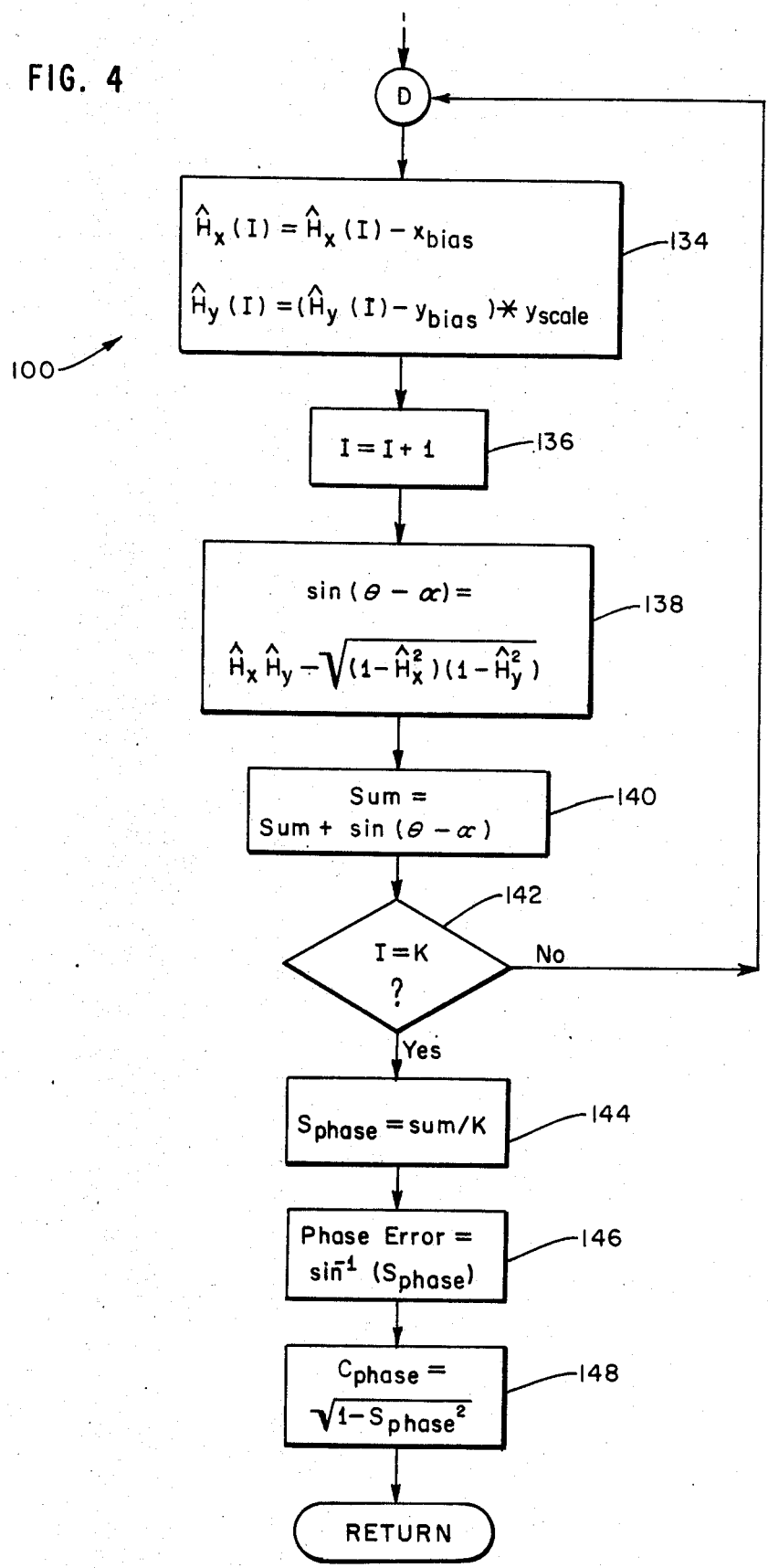

The process according to the present invention and implemented in the processor 60, described above, includes the process 100 steps illustrated by the flowchart comprising FIGS. 2-4. In FIG. 2, the process 100 is initialized at step 102, wherein the data point index I and other parameters are initialized and the coil values are read from the samplers at step 104. The signals read are processed to provide an angle from an arc tangent, which is also stored in step 106, which then issues instructions to indicate that the calibration turn may be begun at step 108. The signals from the orthogonal sensing coils are read at step 110, and smoothed angle estimates are provided at step 112. The step 114 provides the minimum/maximum routine after which a new value of angle is calculated at step 116 from the arctangent of the estimated signal values.

The process 100 continues on FIG. 3, wherein the relative magnitude of the angles $\theta$ and $\theta_R$ is determined at step 118 relative to an incremental value, initially 1°. If the value of the angle is less than the reference $\theta_R$ plus the increment, the difference between the reference and the measured angle is compared to 370° at step 120. If the magnitude is greater than 370°, the value K (maximum sample index number) is set to the value of index I, and index I is reset to zero, indicating that the calibration data is complete at step 122. Thereafter, the X and Y bias coefficients are determined at step 124 as well as determining the Y scale coefficient at step 126. If in step 118 the angle is not less than the reference angle plus an incremental value, the system begins step 128, calculating a $\theta_K$, and storing a value at step 130, thereafter incrementing the index I by 1 at step 132 to resume the process beginning with step 120, discussed above. If the angle difference measured in step 120 is not greater than 370°, the system then jumps to step 110, to thereafter repeat the above-described sequence.

After computing the Y scale factor in step 126, the process 100 continues on FIG. 4, wherein the corrected signals are calculated at step 134. Afterwards, the I parameter is incremented by 1 at step 136. The sin value is calculated at step 138, whereafter the step 140 provides a sum of the calculated signals. At step 142, the index I is compared to the maximum data point index K, and if equal, the process continues at step 144, wherein the $S_{phase}$ parameter is calculated. The phase error is thereafter calculated at step 146, and finally the $C_{phase}$ value is calculated at step 148. Afterwards, the initialization and calibration program returns, and the compass may now produce precise angle readings according to the method according to the present invention.

Modifications and substitutions made by one skilled in the art according to the present invention are within the scope of the present invention, which is not to be limited except by the claims which follow.

We claim:

1. A method of providing a corrected compass bearing, comprising the steps of:

providing a plurality of magnetic field sensors in orthogonal relationship, including at least an X and a Y magnetic field sensor;

calculating bias terms from the average signal from the signals produced by each said X and said Y magnetic field sensors over all signals;

subtracting out the bias term from each magnetic field sensor output signal;

calculating raw angle from said X, Y magnetic field sensor output signals;

comparing said raw angle to a reference table for providing an output angle;

generating B and C terms for removing individual X and Y one cycle bias signal components, respectively, therefrom;

generating a D term according to two cycle signal components of said magnetic field sensor output signals;

normalizing the D term amplitude range from each X, Y magnetic field sensor;

rotating the X and Y magnetic field sensors in a fixed field to detect all peak amplitudes of each magnetic field sensor and to measure a sinusoidal signal of each said magnetic field sensor;

generating an E term phase component for adjusting the two cycle phase error signals of the magnetic field sensor signals;

generating an A term according to the difference between a known heading and the corresponding reference table output angle;

generating a correction signal according to the formula $A + B \sin \phi + C \cos \phi + D \sin 2\phi + E \cos 2\phi$; and adding said correction signal to an uncorrected compass bearing signal.

2. The method of claim 1, further including the step of correcting for vertical magnetic field components.

3. The method of claim 2, wherein the step of correcting for vertical magnetic field components includes at least one of:

orienting said magnetic field sensors in a horizontal plane, and correcting said magnetic field sensor output signals for said vertical magnetic field.

4. A magnetic compass, comprising:

a plurality of magnetic field sensing means including at least an x magnetic field sensing means and a y magnetic field sensing means;

angle detection means providing an uncorrected compass angle from the output of each said magnetic field sensing means, wherein said uncorrected compass angle includes an average offset error, single cycle errors, and double cycle errors, said angle detection means having:

means for correcting the average offset error in said uncorrected compass angle;

single cycle error correction means for adjusting said uncorrected compass angle for permanent magnet anomalies;

double cycle error correction means for adjusting said uncorrected compass angle for induced magnetic anomalies; and phase correction means for adjusting said uncorrected compass angle for errors between the phase angle of the X and Y magnetic field sensing means.

5. The magnetic compass of claim 4, further including sample means for sampling the output signal of each said x and y magnetic field sensors and providing the sampled output signals to said angle detection means.

6. A magnetic compass, comprising:

a plurality of magnetic field sensing means including at least an x magnetic field sensing means and a y magnetic field sensing means;

angle detection means providing an uncorrected compass angle from the outpaut of each said magnetic field sensing means, wherein said uncorrected compass angle includes an average offset error, single cycle errors, and double cycle errors, said angle detection means having:

means for correcting the average offset error in said uncorrected compass angle;

single cycle error correction means for adjusting said uncorrected compass angle for permanent magnet anomalies; and double cycle error correction means for adjusting said uncorrected compass angle for induced magnetic anomalies, wherein at least one of said means for correcting the average offset error, said single cycle error correction means, and said double cycle error correction means includes:

a look-up data table providing table data, and calculation means to provide a corrected angle output according to said uncorrected compass angle and said table data.

* * * * *

UNITED STATES PATENT AND TRADEMARK OFFICE
CERTIFICATE OF CORRECTION

PATENT NO. : 4,698,912                Page 1 of 2
DATED : October 13, 1987
INVENTOR(S) : John T. Fowler; Douglas C. Gilbert It is certified that error appears in the above-identified patent and that said Letters Patent is hereby corrected as shown below:

Column 1, line 36, "$\phi = \theta + a + b\sin + c \cos \theta$" should read
--$\phi = \theta + a + b \sin \theta + c \cos \theta$--

Column 2, line 30, "$\overline{\theta-\phi} = \overline{L+A+B \sin \phi} + \overline{C \cos \phi} + \overline{D \sin 2\phi} + \overline{E \cos 2\phi}$"
should read
--$\overline{\theta-\phi} = \overline{L+A+B \sin\phi} + \overline{C \cos \phi} + \overline{D \sin 2\phi} + \overline{E \cos 2\phi}$--

Column 2, line 40, "multiplied by sin $\theta$:" should read
--multiplied by sin $\phi$:--

Column 2, line 50, "$B = \overline{2(\theta-\phi)\sin \theta}$." should read
--$B = \overline{2(\theta-\phi)\sin \phi}$.--

Column 2, line 57, "$D = \overline{2(\theta-\phi)\sin (2\phi}$" should read
--$D = \overline{2(\theta-\phi)\sin (2\phi)}$--

Column 2, line 59, "$E = \overline{2(\theta-\phi)\cos (2\phi}$" should read
--$E = \overline{2(\theta-\phi)\cos (2\phi)}$--

Column 4, line 38, "magnetisum" should read --magnetism--

Column 4, line 63, "strength, 1" should read --strength, $\ell$--

UNITED STATES PATENT AND TRADEMARK OFFICE
CERTIFICATE OF CORRECTION

PATENT NO. : 4,698,912

DATED : October 13, 1987

INVENTOR(S) : John T. Fowler; Douglas C. Gilbert

It is certified that error appears in the above-identified patent and that said Letters Patent is hereby corrected as shown below:

Column 5, line 4, "X coil = H cos θ + Hs cos γ = H cos θ + 1H cos γ cos"

should read

--X coil = H cos θ + Hs cos γ = H cos θ + ℓH cos γ cos--

Column 5, line 36, "$\gamma_x = -\cotan^{-1}\{[1 + \ell H \cos \gamma]/1 \sin \gamma\}$"

should read

--$\gamma_x = -\cotan^{-1}\{[1 + \ell H \cos \gamma]/\ell \sin \gamma\}$--

Column 5, line 38, "$\gamma_y = \tan^{-1}\{[-1 \cos \gamma]/[1 - 1H \sin \gamma]\}$"

should read

--$\gamma_y = \tan^{-1}\{[-\ell \cos \gamma]/[1 - \ell H \sin \gamma]\}$--

Signed and Sealed this

Thirteenth Day of December, 1988

Attest:

DONALD J. QUIGG

*Attesting Officer*  *Commissioner of Patents and Trademarks*